E. P. DAUTION.
CHEESE SERVER.
APPLICATION FILED MAY 24, 1912.
1,047,920.
Patented Dec. 24, 1912.
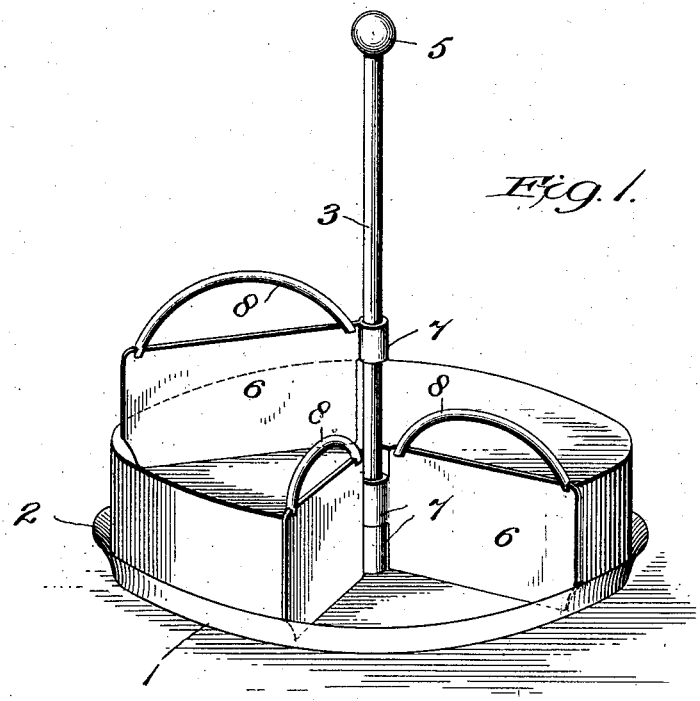
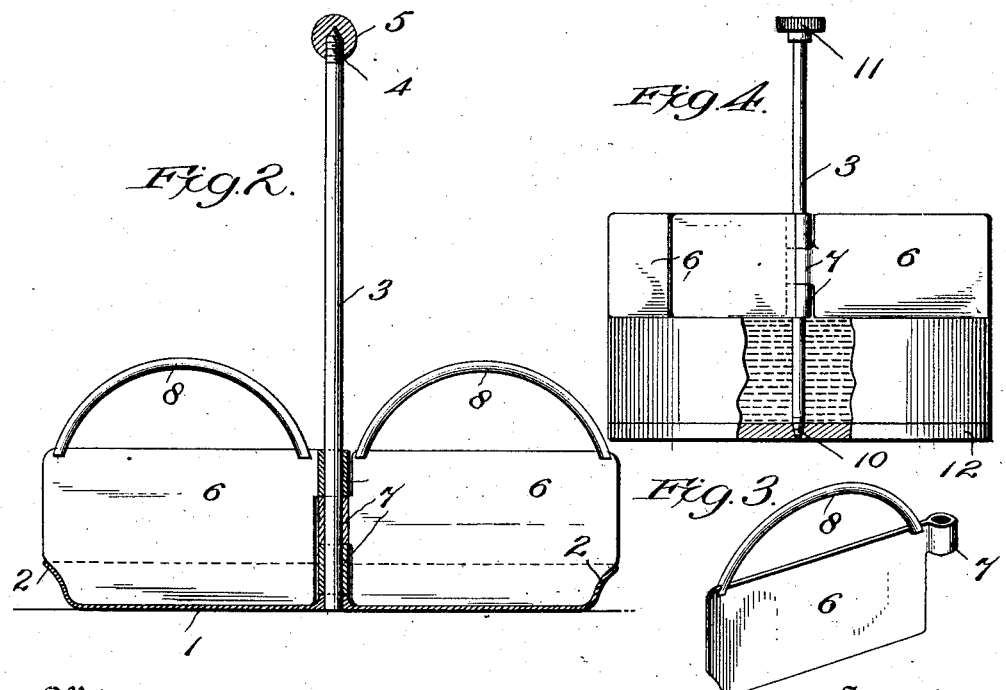
Witnesses
Inventor
Elie P. Daution
By his Attorney

UNITED STATES PATENT OFFICE.

ELIE P. DAUTION, OF NEW YORK, N. Y.

CHEESE-SERVER.

1,047,920.　　　　　Specification of Letters Patent.　　Patented Dec. 24, 1912.

Application filed May 24, 1912. Serial No. 699,549.

*To all whom it may concern:*

Be it known that I, ELIE P. DAUTION, a citizen of the United States of America, residing at the city of New York, county of New York, and State of New York, have invented certain new and useful Improvements in Cheese-Servers, of which the following is a specification.

This invention relates to certain new and useful improvements in cheese servers or the like and has for its objects to provide a device of this character that will be simple in construction and cheap to manufacture and by its use a great saving will be effected.

To these ends the invention consists in the novel details of construction and combination of parts more fully hereinafter described and particularly pointed out in the claims.

Referring to the drawings forming a part of this specification in which like numerals designate like parts in all the views: Figure 1 is a perspective view of my improved device shown with a portion of a cheese. Fig. 2 is a cross sectional view thereof with the cheese omitted. Fig. 3 is a detail perspective view of one of the blades and Fig. 4 is a detail view of a modified form of device showing the rod penetrating a cheese and secured within the bottom of the cheese box.

Heretofore in serving of cheese and especially Camembert cheese and the like, the cheese is usually brought to the table on a plate. The user generally serves himself, using an ordinary knife to cut the cheese which if fresh, is very creamy or pasty and when once cut, flows over the plate. This action on the part of the cheese is undesirable first because it presents an unsightly appearance and at the same time becomes in cafés, unfit for serving at different tables. By the use of my improved device, however, these foregoing objections in handling the cheese are overcome; the cheese is served on a neat tray and when cut by the knives, these prevent it from flowing and forming an unsightly appearance, whereby the cheese may be again served to another party.

The device comprises a tray 1 which has an upturned surrounding flaring edge 2, and a central rod 3 which rod is securely held to the tray and is provided on its upper end with the screw threaded portion 4 to which is screwed a stop 5. Blades 6 provided with the bearing portions 7 are angularly disposed and slidably mounted on the rod 3. These blades have their lower outer corners cut away to conform to the inner surface of the upturned edge 2 and are provided on their upper edges with handles 8. The bearing portions 7 of the blades are adapted to be arranged on the rod as shown in the drawing, so that, when assembled they will not interfere with each other. This arrangement admits the blades being operated independently as when being passed through the cheese and in being turned to required distances apart.

When the device is to be used the stop 5 is first unscrewed and the knives are removed. The tray is then inverted and the rod is pushed through the center of the cheese, which has previously been removed from its box. The tray is next returned to its proper position, the knives are again placed on the rod and the top screwed on the end of the rod. A portion of cheese is then cut by pushing down on the blades, the cut portion is then removed, the blades covering and protecting the cut surface and preventing the cheese from flowing. If a second piece is desired the third blade is used and so on, the blades being swung around the rod and cutting off the desired amounts.

In the modification as shown in Fig. 4, the tray is eliminated, the rod 3 is provided at its lower end with a tapering screw threaded portion 10 and at its upper end with an enlarged milled head 11, and the blades may or may not be provided with the handles. In using this form of device, the cover and sides of the cheese box are first removed and the rod is pushed through the center of the cheese and screwed into the bottom of the box 12, the blades resting on top of the cheese as shown.

From the foregoing it will be seen that by the use of a device constructed in accordance with my invention that a cheese may be served in a neat and attractive manner and it will be also observed that the device is constructed so that the parts thereof may be readily detached and cleaned, thereby rendering the device efficient from the sanitary point of view.

It is obvious that those skilled in the art may vary the details of construction and combination of parts without departing from the spirit and scope of my invention and therefore I do not wish to be limited to such features except as may be required by the claims.

What I claim is:—

1. A device for cutting cheese or the like comprising a rod adapted to penetrate the material; and a plurality of angularly and independently movable blades, slidably mounted on said rod, substantially as described.

2. A device of the character described comprising a rod adapted to penetrate the material and blades angularly and slidably mounted on said rod, said blades adapted for cutting the material and covering and protecting the cut surface thereof, substantially as described.

3. A device of the character described comprising a rod adapted to penetrate the material and blades angularly and slidably mounted on said rod, said blades having the respective side edges thereof disposed in common planes for the purpose set forth.

4. A device for cutting cheese or the like comprising a rod adapted to penetrate the material and blades mounted to have independent angular movement on said rod and adapted to be held against the faces of the material to be cut; and a third blade mounted to have angular and sliding movement on the rod, substantially as described.

5. A device for cutting cheese or the like comprising a tray, a rod adapted to penetrate the material and blades angularly and slidably mounted on said rod, substantially as described.

6. A device for cutting cheese or the like comprising a tray; a rod mounted on the tray; a plurality of angularly and independently movable blades slidably mounted on said rod; and handles mounted on said blades, substantially as described.

7. In a device for cutting cheese and the like the combination of a support for holding the material to be cut; a rod having one end detachably connected to the center of the support and a plurality of angularly and independently movable blades slidably mounted on said rod, substantially as described.

In testimony whereof I, ELIE P. DAUTION, have signed my name to this specification in the presence of two subscribing witnesses.

ELIE P. DAUTION.

Witnesses:
C. MONNIER,
JEAN BURRÈRE.

Copies of this patent may be obtained for five cents each, by addressing the "Commissioner of Patents, Washington, D. C."